United States Patent [19]
Blau et al.

[11] 3,737,233
[45] June 5, 1973

[54] VECTOR VELOCIMETER

[75] Inventors: Donald Z. Blau, City Island; Jesse C. Kaufman, Yorktown Heights, both of N.Y.

[73] Assignee: The Singer Company, New York, N.Y.

[22] Filed: Feb. 22, 1971

[21] Appl. No.: 117,349

[52] U.S. Cl. .................................................356/28
[51] Int. Cl. .............................................G01p 3/36
[58] Field of Search........................................356/28

[56] References Cited

UNITED STATES PATENTS

| | | | |
|---|---|---|---|
| 3,432,237 | 3/1969 | Flower et al. | 356/28 |
| 2,772,479 | 12/1956 | Doyle | 356/28 |
| 3,511,150 | 5/1970 | Whitney et al. | 356/28 |
| 2,942,119 | 6/1960 | King et al. | 356/28 |

*Primary Examiner*—Benjamin A. Borchelt
*Assistant Examiner*—S. C. Buczinski
*Attorney*—S. A. Giarratana and Thomas W. Kennedy

[57] ABSTRACT

A velocimeter having: a source of coherent radiation directed to irradiate a surface from which the relative velocity is to be measured; a receiver for the resulting reflection of coherent radiation from said surface, the receiver including a receiving aperture and a photodetector responsive to the reflected radiation passing through the aperture; a drive to translate the aperture, and; circuitry to indicate the frequencies of the signals generated by the photodetector when the aperture is stationary in relation to the photodetector and when the aperture is translated in relation to said photodetector. The velocimeter determines the magnitude and the direction of the velocity vector it measures. A navigation velocimeter, using the described velocimeter, is disclosed for use in an aircraft to determine the direction and magnitude of the velocity vector of the aircraft with respect to the ground. The aperature hereinabove mentioned is preferably a plurality of slits, alternately transparent and opaque, such as in a transmission type optical diffraction grating.

13 Claims, 9 Drawing Figures

INVENTOR
DONALD Z. BLAU &
JESSE C. KAUFMAN

ATTORNEYS

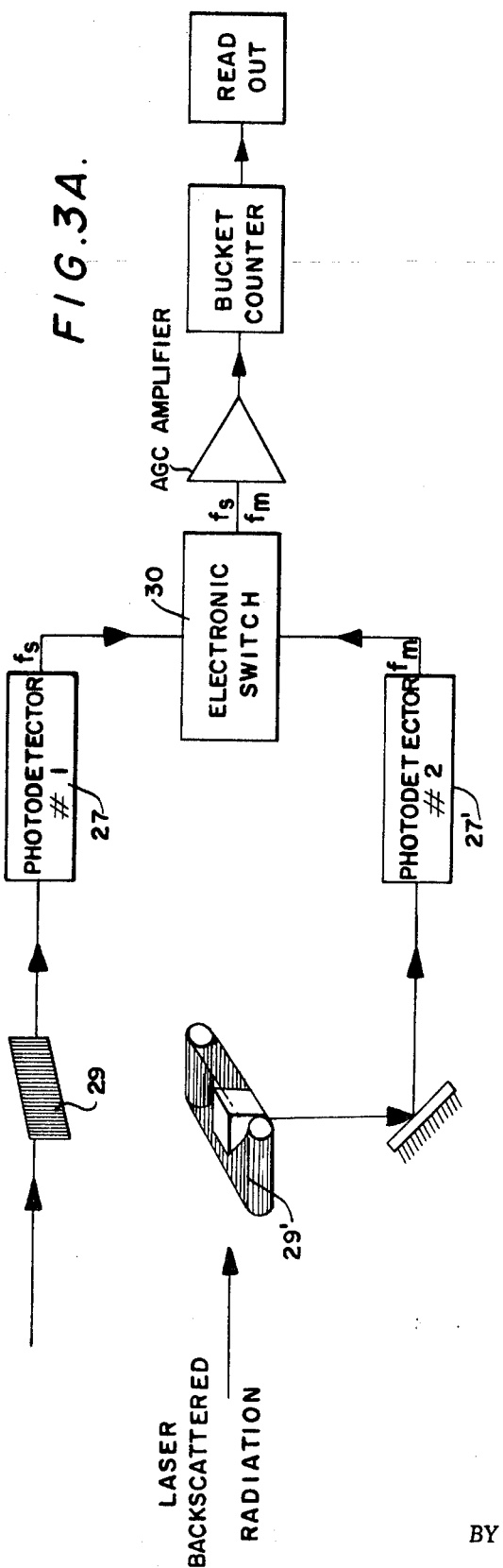
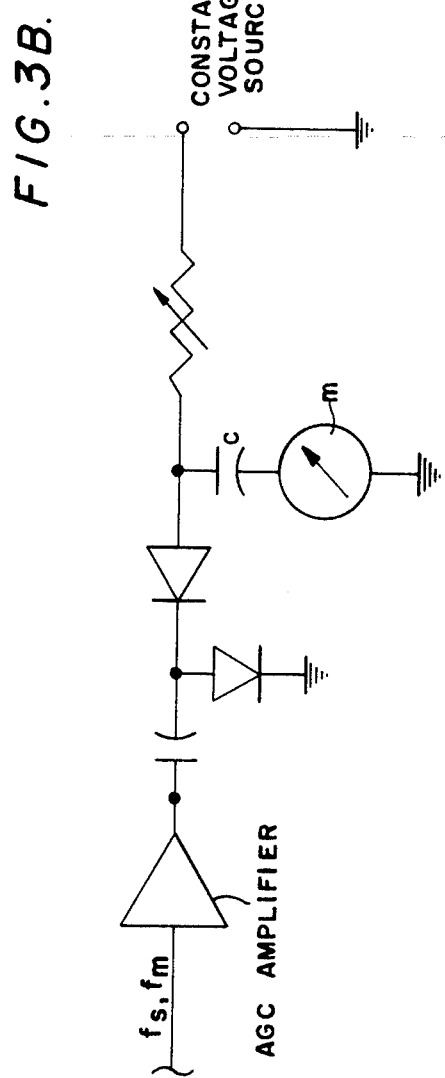

INVENTOR
DONALD Z. BLAU &
JESSE C. KAUFMAN

BY
Thomas W. Kennedy ATTORNEYS

VECTOR VELOCIMETER

CROSS-REFERENCE TO RELATED APPLICATION

U.S. patent application Ser. No. 86,897 entitled "Vector Velocimeter (Direction Indicating Velocimeter)" by R.A. Flower et al, now abandoned.

BACKGROUND OF THE INVENTION

1. Field of the Invention

This invention relates to velocity measuring devices and more particularly to devices in which a frequency characteristic proportional to the relative velocity and direction between a body and a target is derived from wave radiation projected from the body to the target, reflected therefrom, and returned to the projecting body.

2. Description of the Prior Art

The measurement of the relative velocity between two objects without any physical contact between them is frequently desirable. Various devices using different portions of the electromagnetic spectrum to accomplish this purpose have been devised. Such devices are disclosed in U.S. Pat. No. 3,432,237 issued Mar. 11, 1969 to the assignee of the present application. That patent discloses a source of radiation, such as a laser, for directing a substantially monochromatic beam toward a reference surface. The reflected radiation is received by a device where it is passed through an aperture or a plurality of slits located near the source and received by a photomultiplier tube which has its anode connected to a frequency meter. The output of the frequency meter is a function of the magnitude of the relative velocity between the radiation source and a reflecting surface. The patentees in the above-identified patent also contemplated that other wave sources of limited band width yielding radio waves, sound or light could be used. According to another aspect of their invention, the aforementioned patentees disclose a pair of the above-described receiving devices, each device having its velocity axis inclined at an equal angle on opposite sides of a vehicle. The output from the receiving devices is processed by a suitable computer to obtain the magnitudes of the velocity and the drift angle of the vehicle.

While the velocity measuring devices of the aforementioned patent are reliable in their operation and fulfill their intended purpose, it has been found that it would be desirable to provide a velocity measuring device of a similar character but also having the capability to indicate both the magnitude and direction of the velocity vector. In the case of a vehicle, it would be desirable to provide a velocimeter to indicate the phase of the drift angle of the vehicle as well as the magnitude of such angle.

SUMMARY OF THE INVENTION

An object of the invention is to provide a velocimeter for determining the magnitude and direction of the relative velocity between two objects which are not in physical contact or where such physical contact as may be present does not lead to accurate velocity determination.

Another object of the invention is to provide a velocimeter for determining the magnitude of the velocity and drift angle of a vehicle, the phase of the drift angle, and the absolute heading of said vehicle.

Other objects and advantages of the present invention will be apparent to those skilled in the art by description of the preferred embodiments of the invention which follows.

According to one aspect, the invention comprises a velocimeter having a source of coherent radiation directed to irradiate a surface from which the relative velocity is to be measured. The velocimeter also has light receiving means to receive the resulting reflection of the coherent radiation from the surface. The light receiving means includes a receiving aperture and detecting means responsive to the intensity of the received radiation passing through the aperture. The velocimeter detects the direction of the relative velocity by providing a predetermined relative motion between the aperture and the reflected radiation received by the light receiving means. When the detecting means and receiving aperture are relatively stationary, the reflected radiation passed through the aperture generates a signal with a frequency proportional to the magnitude of the relative velocity between the velocimeter and the surface. When the receiving aperture is translated with respect to the reflected radiation in a known direction and at a speed less than the unknown relative velocity to be measured, the reflected radiation passed through the aperture generates a signal with a frequency component due to the relative velocity of the velocimeter and the surface and another component due to the translation of the receiving aperture. If the frequency of the signal generated is greater than the frequency generated when the detecting means and aperture are relatively stationary, then the direction of the velocity vector is opposite to the direction in which the receiving aperture is translated with respect to the reflected radiation. Conversely, if the frequency of the signal generated is less than the frequency generated when the detecting means and aperture are relatively stationary, then the direction of the velocity vector is the same as the direction in which the receiving aperture is translated.

According to another aspect, the invention relates to a velocimeter for determining the relative velocity vector between a target and a vehicle. The velocimeter has a source of coherent radiation directed to irradiate a surface on the target. It also has light receiving means to receive the resulting reflection of coherent radiation. This light receiving means includes at least first and second gratings having their respective grating lines oriented at first and second known angles with the longitudinal axis of the vehicle, respectively. The light receiving means also includes first and second detecting means responsive to the intensity of the received radiation passing through the first and second gratings, respectively. The light receiving means also includes translating means to provide a predetermined relative motion between the second grating and the reflected coherent radiation received by the light receiving means. The velocimeter according to this aspect of the invention can be used to determine the magnitude of the velocity vector and the drift angle as well as the phase of the drift angle. When the detecting means and gratings are relatively stationary, the reflected radiation passed through the gratings generates respective signals with frequencies proportional to the magnitude of the relative velocity components along axes perpendicular to the lines of the respective gratings. These respective signals are combinable according to trigonometric laws to determine the magnitude of the relative velocity vector and the magnitude of the drift angle. As described on the penultimate paragraph, the second grating can be translated in a known direction to provide a frequency change in the signal from the second detecting means. The frequency change is indicative of the direction of the relative velocity component in a direction perpendicular to the lines of the second grating. Vectorial laws can be used to determine the phase of the drift angle once the latter direction is known.

BRIEF DESCRIPTION OF THE DRAWINGS

FIGS. 3A and B are schematic representations of another embodiment of the present invention.

DESCRIPTION OF THE PREFERRED EMBODIMENTS

Figure 1:
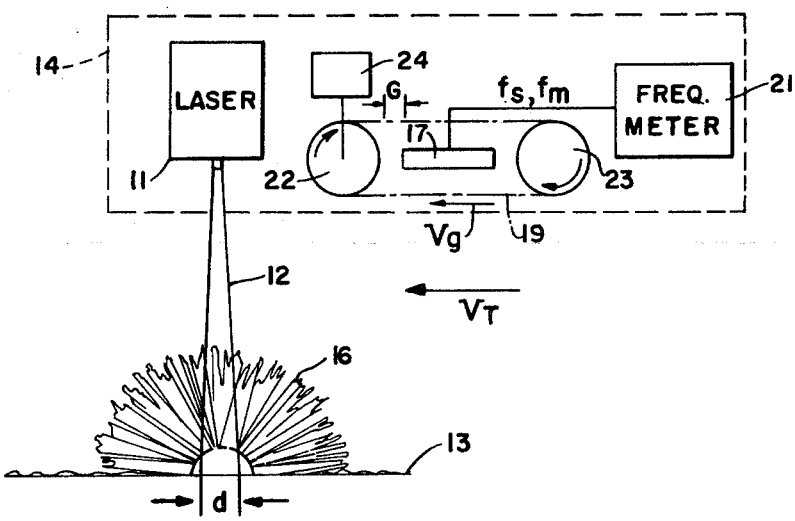
FIG. 1 is a schematic representation of one embodiment of the present invention.
Figure 2:
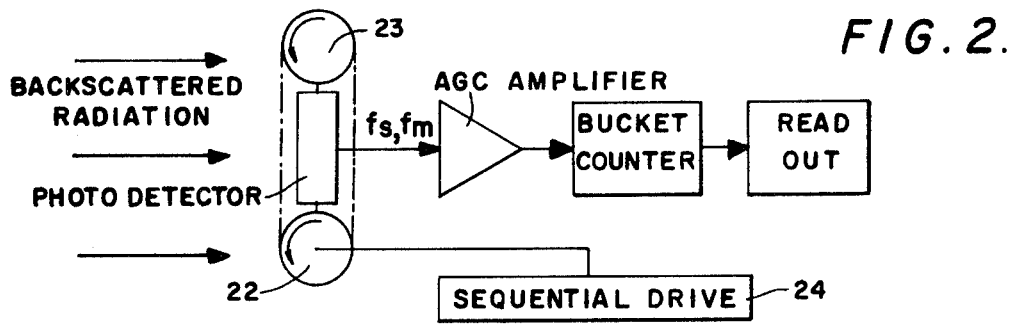
FIG. 2 is a schematic representation of details of an embodiment similar to that of FIG. 1.

FIGS. 1 and 2 illustrate one embodiment of the present invention. The velocimeter shown by FIGS. 1 and 2 are improvements of the velocimeter disclosed in the aforementioned U.S. Patent and applicants intend that the disclosure therein be incorporated in this description. Referring to FIG. 1, a laser 11 or other monochromatic source of electromagnetic radiation projects a beam of radiation 12 toward a reflecting surface 13 of the target. The laser 11 is mounted on a supporting structure generally indicated by the dotted rectangle 14 which may be a vehicle or a fixed supporting structure. The beam 12, in impinging on the surface 13 over a finite area having a diameter d produces a backscattered pattern 16. As described in the aforementioned U.S. Patent, the radiation backscattered from a target surface exhibits a lobed or "granular" pattern. This requires that the radiation source be at least partially coherent (preferably highly coherent) and that the target surface be to some degree non-specular at the radiation wavelength. This is easily met when laser sources illuminate most surfaces since the dimensions of the surface elements are large with respect to the radiation wavelength, thus, the scattering centers reradiate with mutually random phases. It should be understood that applicants' velocimeter may use various wavelengths of radiation provided the above conditions are met so as to obtain a "granular" backscattered pattern. The velocimeter of FIG. 1 also has a receiver mounted on the supporting structure 14. The receiver comprises a photodector 17 on which the return radiation is impressed after passing through the transparent bars of an optical diffraction gating 19 consising of alternately transparent and opaque bars. The bars of the grating 19 are oriented to be normal to the velocity vector $V_T$ of the supporting structure relative to the reflecting surface 13. The output of the photodetector is impressed on a frequency measuring device 21 which may be any well-known frequency meter. To this point, the elements of FIG. 1 are conventional and correspond to the velocimeter disclosed by the aforementioned patent.

FIG. 1 illustrates the improvement according to one embodiment of the present invention wherein the optical diffraction grating 19 is in the form of an endless belt and is provided with means to translate it at a known velocity, $V_g$, during part of the time. The translating means comprises a driven pulley 22 and an idler pulley 23. Pulley 22 is rotated by a sequential drive 24 so that grating 19 is moved at $V_g$ part of the time and remains stationary with respect to photodetector 17 the remainder of the time. The significance of such grating translation will be described below.

FIG. 2 is a schematic illustration of a preferred receiver embodiment which is generally described above with reference to FIG. 1. According to FIG. 2, the signals from the photodetector are fed to an amplifier, then to a bucket counter whose output voltage is proportional to the frequency of the signals from the photodetector. When grating 19 is stationary in relation to photodetector 17, the frequency of the signal from the photodetector is $f_s$; when the grating 19 is translated in relation to the photodector 17, the frequency of the signal from the photodetector is $f_m$. The read out means indicates the magnitude and direction of the velocity vector $V_T$ in a manner now to be described.

The embodiment of FIGS. 1 and 2 includes an optical diffraction grating 19 having grating line spacings, G, and being in the form of an endless loop which is translated at a fixed velocity $V_g$ (of known direction and magnitude) in front of a stationary photodetector 17. For a stationary grating having a particular space frequency, SF, for a target moving at a fixed velocity $V_T$, normal to the grating lines and for a given system optical leverage OL, the velocimeter generates a spectrum whose center frequency $f_s$ is related to this relative velocity by $$f_s = (OL)(SF)(V_T)$$

where $OL$ = optical leverage which is the ratio of granule velocity in the receiving plane to that of the target velocity. The numerical quantity assigned to OL is determined by the geometrical properties of the transmitter beam as discussed in U.S. Pat. No. 3,432,237;

$SF$ = space frequency which is the reciprocal of the line spacing, G, of the optical grating lines.

If the grating is translated in front of the photodetector 17 at a fixed velocity $V_g$, the center frequency $f_m$ generated by the detector will be altered depending upon the relative velocity between the target and grating, and upon the target velocity direction and direction of grating motion. The velocity of the grating loop must be such that the resultant change in frequency $\Delta f$, given by $$\Delta f = (SF)(V_g)$$

is detectable. This constitutes a lower limit for $\Delta f$. The induced change in frequency resulting from the grating motion must not exceed the magnitude of the generated center frequency $f_s$, when the grating is stationary. This represents the upper limit for $\Delta f$.

To determine the direction of relative target-supporting structure motion (for a known optical leverage), it is only necessary to observe the direction of the frequency change, with respect to the frequency generated when the grating is stationary, within the limits previously described. For example, for a grating velocity $V_g$, as shown in FIG. 1, the frequency will decrease and thus indicate that the direction of the vector $V_T$ is the same as the known direction for vector $V_g$.

FIG. 3A illustrates another embodiment of the present invention. This embodiment also generates signals having frequencies $f_s$ and $f_m$ analogous to those signals described above in connection with FIGS. 1 and 2. In the latter figures, the $f_x$ and $f_m$ signals were generated by alternately changing the grating 19 from a state of no movement relative to the photodetector 17 to one of uniform grating motion. This provides a continuous readout of both target velocity and direction. According to FIG. 3A, two photodetectors 27, 27' are used in the receiver and a fixed grating 29 is placed in front of photodetector 27 and a continuously moving grating 29' is placed in front of the photodetector 27'. An electronic switch 30 alternately feeds signals having frequencies $f_s$ and $f_m$ to read out instrumentation similar to that described in connection with FIGS. 1 and 2. FIG. 3B shows details of a typical circuit such as could be used in FIG. 3A. The magnitude of $\Delta f$ is given by $|\Delta f| = f_s - f_m$ and is indicated by the magnitude of deflection of the readout ammeter M (initially adjusted at the center of the scale for $\Delta f = 0$) while the sign of $\Delta f$ is given by the direction of deflection of the meter pointer which responds to the current produced due to the charging and discharging of capacitor C.

Figure 4:
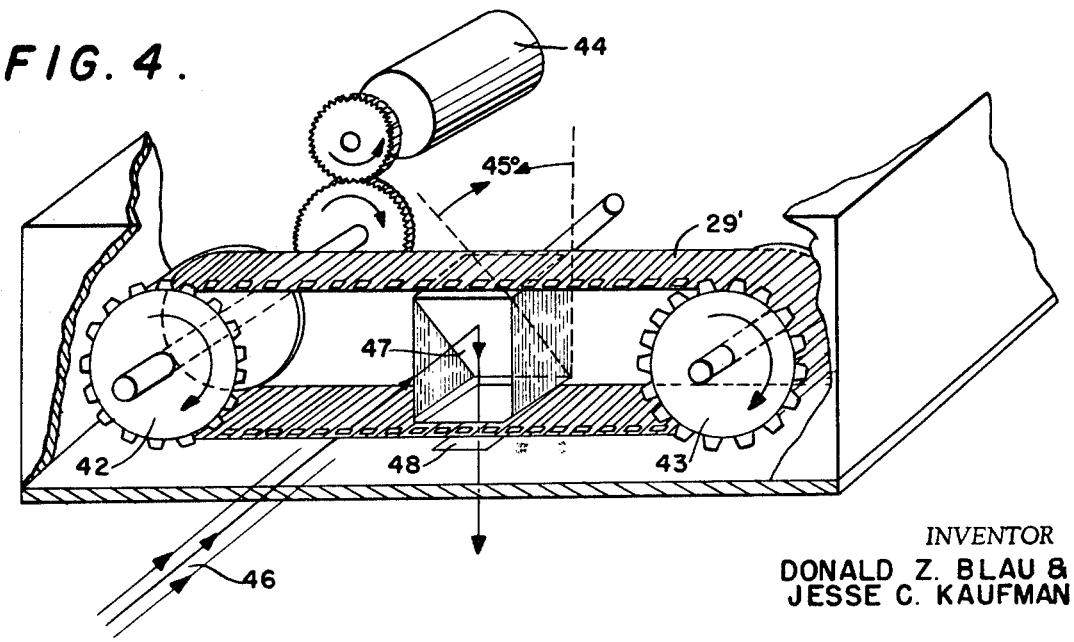
FIG. 4 is an oblique view, with portions broken away, of further details of the embodiment of FIG. 3A.

FIG. 4 illustrates a preferred translating means for the grating 29' of the embodiment of FIG. 3A. The grating 29' is supported by a driven sprocket pulley 42 and an idler pulley 43. Pulley 42 is driven by a motor 44 through a suitable gear train. The backscattered radiation 46 is reflected through the grating 29' by a 45° front surface mirror or prism 47; then through a limiting aperture 48 to the photodetector.

Figure 5:
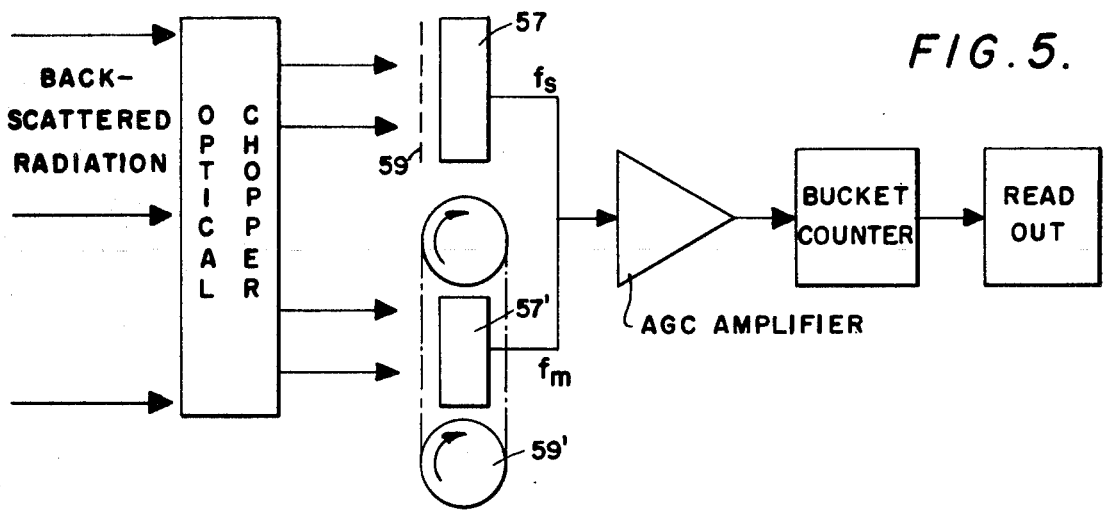
FIG. 5 is a schematic representation of another embodiment of the present invention.

FIG. 5 illustrates another embodiment of the present invention. This embodiment also generates signals having frequencies $f_s$ and $f_m$ analogous to those signals described above in connection with FIGS. 1 and 2. According to FIG. 5, a single photodetector is used and one portion 57 is masked by a fixed grating 59 and another portion 57' is masked by a continuously moving grating 59'. The gratings are preceded by an optical chopper e.g., rotary shutter, which alternately allows backscattered radiation to pass through gratings 59, 59' and to photodetector portions 57, 57'. Rather than using a single photodetector with two portions 57, 57', two separate photodetectors could be used.

A further aspect of applicants' invention relates to a velocimeter which has application to navigation systems. It enables a moving vehicle to determine its velocity vector (ground speed and drift angle) relative to a stationary, non-specular target. In one embodiment, FIG. 7, the velocimeter located aboard the vehicle contains a highly coherent source 71 which illuminates the target 73, three detectors which intercept and operate upon a portion of the radiation 76 backscattered from the target and electronic circuitry which combines the outputs of the detectors in such a manner as to provide the desired information, namely, ground speed and drift angle. The radiation 76 backscattered from a target surface exhibits a "granular" structure as described above.

Figure 6:
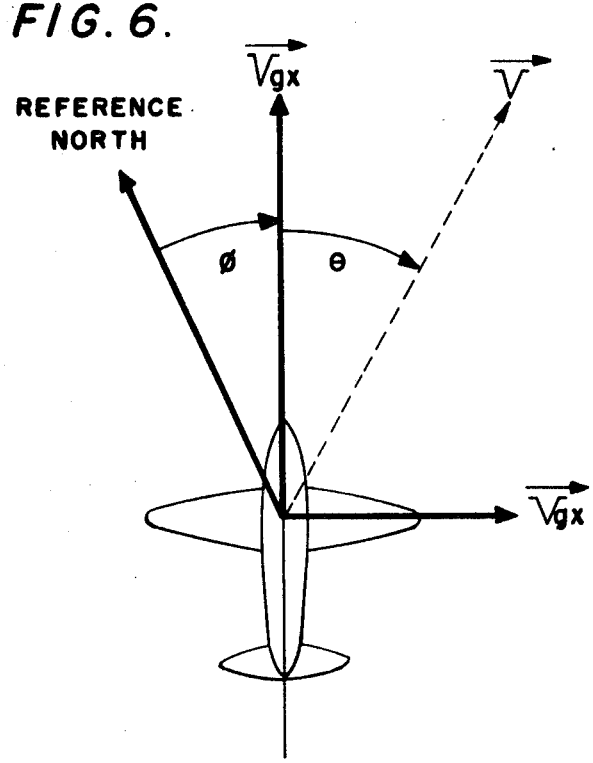
FIG. 6 is a schematic plan representation of an airplane in horizontal flight.
Figure 7:
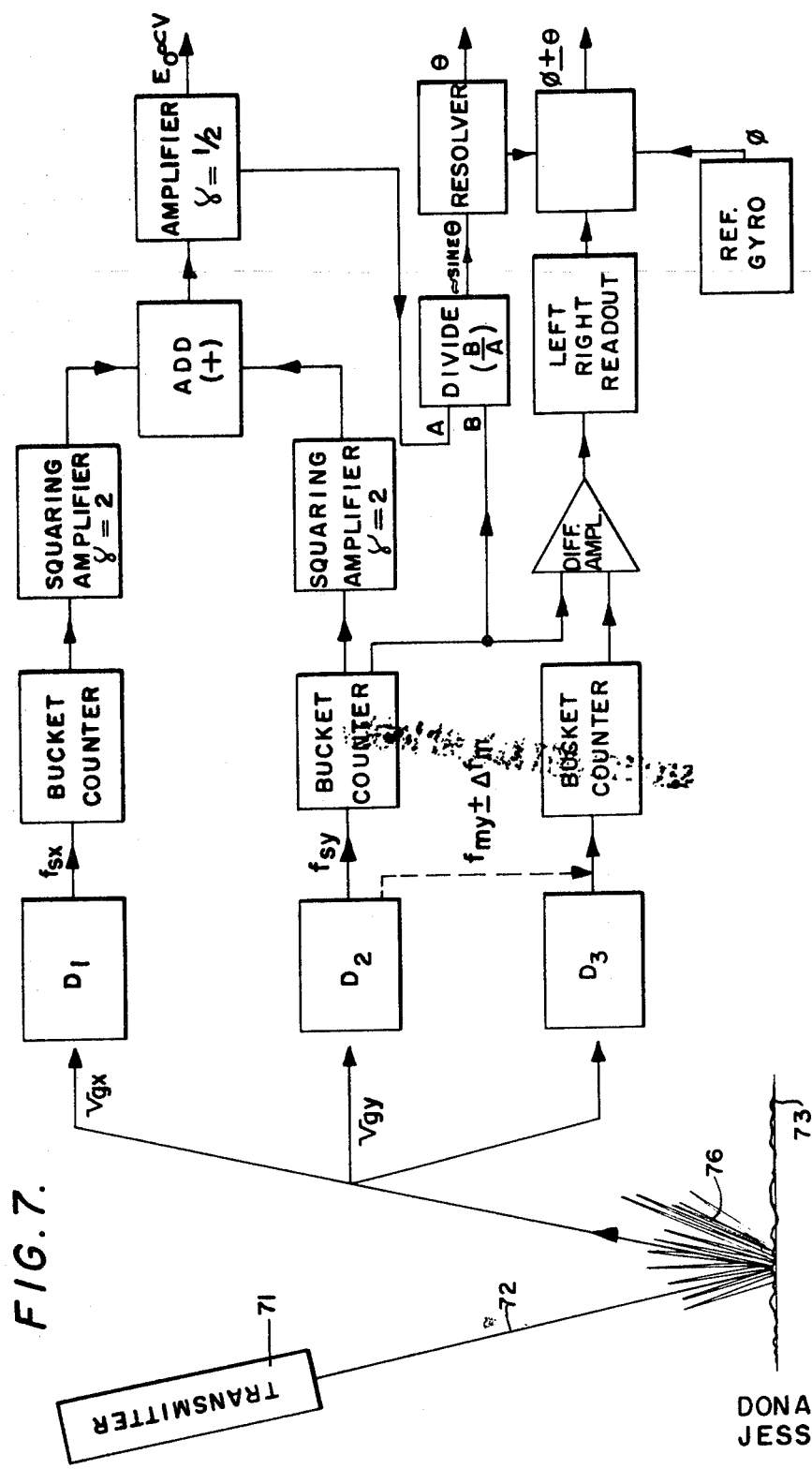
FIG. 7 is a schematic representation of an embodiment of the present invention when used on a vehicle such as an airplane.

For convenience in discussing the velocimeter, an airplane in horizontal flight shall be considered such as depicted in FIG. 6. For the purpose of navigation, the ground speed, $V$, and the drift angle, $\theta$, must be determined. FIG. 7 illustrates one embodiment of applicants' invention whereby these two parameters can be determined.

According to the embodiment of FIG. 7, three detectors are provided: $D_1$, $D_2$, and $D_3$, whose outputs are related to the components of V seen in FIG. 6, namely $V_{gx}$ (velocity along heading), $V_{gy}$ (velocity cross heading), and $\theta$ (drift angle). A gyro provides the necessary heading reference, $\phi$.

Figure 8:
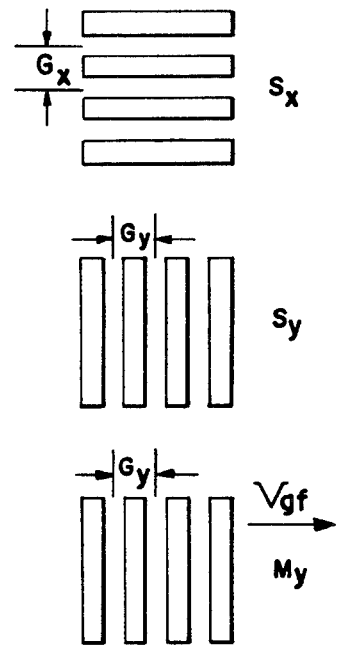
FIG. 8 is a schematic representation of the angle of grating orientation according to one embodiment of the present invention.

The outputs of detectors $D_1$ and $D_2$ provide signals whose center frequencies are proportional to the magnitudes $|V_{gx}|$ and $|V_{gy}|$, respectively. Detectors $D_1$ and $D_2$ contain gratings $S_x$ and $S_y$, respectively. The elements of each of these detectors are essentially alike, both including photodetectors and relatively stationary gratings. They differ only in that the grating ($S_y$) orientation of $D_2$ is in the cross-track direction while that of $D_1$ is in the along-track direction. FIG. 8 illustrates such angular orientation for $S_x$ and $S_y$. The output signals associated with $|V_{gx}|$ and $|V_{gy}|$ have the frequencies $f_{sx}$ and $f_{sy}$, respectively.

The frequency, $f_{sx}$, is generated by the component of velocity associated with the backscattered granular motion which sweeps by the grating, $S_x$ having the grating line spacing $G_x$. Similarly, $f_{sy}$ is generated by the component of velocity associated with the backscattered granular motion which sweeps by the grating, $S_y$, having the grating line spacing, $G_y$. The parameters $f_{sx}$ and $f_{sy}$ are related to $|V_{gx}|$ and $|V_{gy}|$ by $$f_{sx} = (O.L.)(V_{gx})/(G_x) \tag{4}$$

and $$f_{sy} = (O.L.)(V_{gy})/(G_y) \tag{5}$$

respectively, where $O.L.$ = optical leverage as previously discussed.
$V_{gx} = V \cos \theta$
$V_{gy} = V \sin \theta$ For convenience in subsequent signal processing, the grating line spaces, $G_x$ and $G_y$, are chosen to be equal. The grating period is defined as the center-to-center distance of two adjacent grating apertures as seen in FIG. 8.

FIG. 8 illustrates a third grating, $M_y$, which is used in conjunction with $S_y$ to provide the determination of drift angle, $\theta$. Detector $D_3$, which houses grating $M_y$, is identical to detector $D_2$ except that provision is made for continuous grating translation as indicated by the arrow $V_{gf}$ in FIG. 8. A suitable means for providing this translation has previously been discussed above with reference to FIGS. 3A and 4. The frequency associated with grating $M_y$ is generated not only by the passage of moving backscattered granules through the grating, but additionally by an induced change in frequency resulting from intentional grating translation.

If the grating $M_y$ is translated at a fixed velocity, $V_{gf}$, the center frequency generated by the grating after detection will be altered depending upon the relative velocity between the target and grating, and the target velocity direction and the grating direction of translation.

The frequency generated by the grating, $M_y$, due to the grating translation alone, is $\Delta f_m$, given by $$\Delta f_m = V_{gf}/G_y \qquad (6)$$

where the gratings $S_y$ and $M_y$ have the same spacing. The frequency associated with the third detector out-out is, therefore, $$f_{my} \pm \Delta f_m$$

where $f_{my}$ is the frequency generated by the backscattered granular motion in the absence of grating translation. To avoid ambiguity in the phase angle $\theta$, a restriction is imposed so that $$|\Delta f_m| < |f_{my}|$$

This represents an upper limit on $\Delta f_m$ and is explained further below.

The three output frequencies described by equations (4), (5), and (6) can be electronically processed to provide the determination of ground speed, V, and drift angle,$\theta$. The block diagram of FIG. 7 indicates one possible instrumentation. The operation of this block diagram which provides the ground speed and drift angle information is discussed further below.

Ground Speed (V)

The ultimate output of detector $D_1$ is a signal of frequency $f_{sx}$. A D.C. voltage whose amplitude is proportional to this frequency is provided by a bucket counter. Subsequently, a squaring amplifier ($\gamma=2$) provides an output whose amplitude is proportional to the square of the amplitude of its input. The output squaring amplifier is an analog of the "along-track" velocity squared, $(V_{gx})^2$. Similar signal processing of the output of detector $D_2$ provides an analog of the "cross-track" velocity squared, $(V_{gy})^2$. Adding of these latter two outputs which is then followed by square root amplification ($\gamma= \frac{1}{2}$) yields the voltage,$E_o$, which is the analog of the ground speed, V, since a square root of the sum of two squares of vectors in quadrature has been performed. For bucket counters having identical conversion constants, K, (volts/Hz), the output ground speed signal in units of velocity is numerically equal to its voltage amplitude multiplied by $(G_y/O.L.)$ $(K^{-1})$.

Drift Angle ($\theta$)

The outputs of detectors $D_1$ and $D_2$ are again utilized for the determination of the magnitude of the drift angle. Since the output of the bucket counter following detector $D_2$ is directly proportional to the cross-track velocity $V_{gy}$ and since the ground velocity V has now been determined, the sine of the drift angle $\theta$ is the ratio of these two voltages. The required processing is performed by the dividing circuitry ($\gamma= -1$) as depicted in FIG. 7. A resolver is employed to convert sin $\theta$ to $\theta$ (drift angle). A quadrant associated with $\theta$, however, still requires determination.

Phase of Drift Angle

The phase of $\theta$ is derived by utilizing a difference amplifier whose two inputs are derived from the bucket counter outputs of $D_2$ and $D_3$. For small drift angles, the cut-on frequency of the bucket counters in both channels 2 and 3 must equal or exceed the induced $\Delta f_m$ due to the added motion imposed upon $M_y$. This is required so that one of the two possible polarities of the output of the difference amplifier is always associated with one of the two possible quadrants in which $\theta$ may occupy.

The output of the difference amplifier can be applied to a left-right indicator wherein a given polarity signifies a given direction; the opposite polarity signifies the opposite direction. For all cross-track velocities less than the minimum trackable velocity, which corresponds to $\Delta f_m$, the difference amplifier output is zero, which is the off position of the indicator.

The absolute heading with respect to the airframe can be determined by algebraically combining the voltage proportional to $\theta$ and the voltage proportional to $\phi$ provided by a reference gyro. This can be accomplished by utilizing the polarity of the difference amplifier output which signifies the quadrant of $\theta$ (drift angle).

While several embodiments of the invention have been shown and described for illustration purposes, it is to be understood that the invention is not limited thereto. Various changes may also be made in the design and arrangement of the parts without departing from the spirit and scope of the invention as the same will now be understood by those skilled in the art. For example, the embodiment of applicants' invention illustrated in FIG. 7 may be modified (as shown in broken lines) to eliminate $D_3$ if $D_2$ is modified by being provided with a grating which is translated part of the time to generate a signal with a frequency $f_{my} \pm \Delta f_m$ and is stationary the remainder of the time to generate a signal $f_{sy}$.

We claim:

1. In velocimeter comprising a source of coherent radiation directed to illuminate a surface which may move relative to the velocimeter, radiation receiving means to receive the resulting reflection of coherent radiation from said surface including at least one receiving aperture slit oriented perpendicular to the direction in which relative motion is to be measured, and detecting means responsive to the intensity of the received radiation passing through said aperture to develop a first signal having a frequency proportional to the magnitude of the relative velocity between said velocimeter and said surface in a direction perpendicular to said slit, apparatus to provide an indication of the direction of said relative velocity comprising:
   a. means to develop a second signal which will have a frequency greater than that of said first signal when relative motion is in one direction and a frequency less than said first signal when relative motion is in the opposite direction; and
   b. means having as inputs said first and second signals to difference said first and second signals whereby an output of one polarity will represent relative motion in one direction and of the opposite polarity for relative motion in the opposite direction.

2. The invention according to claim 1 wherein said at least one aperture slit comprises a first optical grating consisting of alternately transparent and opaque bars.

3. The invention according to claim 2 wherein said means to develop said second signal comprises means to periodically move said first grating in a first direction parallel to the direction in which relative motion is to be measured whereby the signal developed at the output of said detecting means when the velocimeter is not moving will be said first signal and the signal developed while moving will be said second signal, whereby when the relative motion of said velocitometer and the motion of said slit are both in first direction the frequency of said second signal will be lower than at the frequency of said first signal and when the relative motion of said velocimeter is in a direction opposite to said first direction the frequency of said second signal will be greater than that of said first signal.

4. The invention according to claim 3 wherein said first grating is in the form of an endless belt.

5. The invention according to claim 2 wherein said means to develop said second signal comprise:
  a. a second grating with its bars oriented in the same direction as those of said first grating;
  b. means to move said second grating in a direction parallel to the direction in which relative motion is to be measured; and
  c. second detecting means responsive to the received radiation passing through said second slit to develop said second signal.

6. The invention according to claim 5 wherein said second grating is in the form of an endless belt.

7. The invention according to claim 2 wherein said means to develop said second signal comprises:
  a. a second grating with its bars oriented in the same direction as those of said first grating;
  b. means to move said second grating in a direction parallel to the direction in which relative motion is to be measured;
  c. means to image the radiation passing through said second grating on the detecting means of said first grating; and
  d. means to cause said reflected radiation to be alternately provided to said first and second gratings.

8. The invention according to claim 7 wherein said second grating is in the form of an endless belt.

9. Vehicle navigation velocimeter apparatus to provide an indication of velocity magnitude along aircraft heading and drift velocity magnitude and direction perpendicular to heading comprising:
  a. a source of coherent radiation directed to irradiate the surface over which the vehicle is moving;
  b. first velocimeter receiving means to receive the reflected radiation to develop a first signal having an output frequency proportional to the magnitude of the velocity component along heading;
  c. second velocimeter receiving means to receive the reflected radiation to develop a second signal having a frequency proportional to the magnitude of the velocity component perpendicular to heading;
  d. third velocimeter receiving means to develop a third signal having a frequency proportional to said velocity component perpendicular to heading plus a difference frequency when said velocity is in one direction and minus said difference frequency when said velocity is in the other direction; and
  e. means to difference said second and third signals to provide an indication of the direction of the velocity perpendicular to heading.

10. The invention according to claim 9 wherein said first velocimeter receiving means comprises:
  a. a first optical grating with its bars oriented perpendicular to the direction of heading;
  b. first detecting means responsive to the received radiation passing through said grating to develop said first signal; and wherin said second and third velocitometer receiving means comprise:
  c. a second optical grating with its bars parallel to the heading direction;
  d. second detecting means responsive to the received radiation passing through said gratings;
  e. means to periodically move said second grating in a direction perpendicular to heading; and
  f. means to provide the output of said second detecting means as said second signal when said grating is stationary and as said third signal when said grating is moving.

11. The invention according to claim 9 wherein said first and second velocimeter receiving means comprise respective first and second stationary optical gratings said first grating oriented with its bars perpendicular to the heading direction and said second grating oriented with its bars parallel to said heading direction and respective first and second detecting means responsive to the received radiation passing through said gratings to develop said first and second signals and said third velocimeter receiving means comprises a third grating oriented in the same direction as said second grating, means to move said third grating in a direction perpendicular to heading and third detecting means responsive to the received radiation passing through said third grating to develop said third signal.

12. The invention according to claim 11 and further including analog computing means to develop from said first and second signals the magnitude of ground speed, from said ground speed magnitude and said second signal the magnitude of the drift angle, and from the output of said differencing means the direction of drift angle relative to heading.

13. The invention according to claim 12 wherein there is available in the aircraft an output representing aircraft heading with respect to North and further including means to add said drift angle magnitude and direction to said heading to thereby develop an output representing the actual ground track with respect to North.

* * * * *